(12) United States Patent
Meir Lador et al.

(10) Patent No.: US 11,829,406 B1
(45) Date of Patent: Nov. 28, 2023

(54) IMAGE-BASED DOCUMENT SEARCH USING MACHINE LEARNING

(71) Applicant: INTUIT INC., Mountain View, CA (US)

(72) Inventors: Shir Meir Lador, Givat Shmuel (IL); Sameeksha Khillan, Mountain View, CA (US); Peter Lee Frick, Mountain View, CA (US); Tharathorn Rimchala, Mountain View, CA (US); Guohan Gao, San Jose, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/345,025

(22) Filed: Jun. 30, 2023

(51) Int. Cl.
  *G06V 30/418* (2022.01)
  *G06F 16/532* (2019.01)
  (Continued)

(52) U.S. Cl.
  CPC .......... *G06F 16/532* (2019.01); *G06V 10/762* (2022.01); *G06V 10/774* (2022.01);
  (Continued)

(58) Field of Classification Search
  CPC .. G06F 16/532; G06V 10/762; G06V 10/774; G06V 10/776; G06V 30/413; G06V 30/418
  See application file for complete search history.

(56) References Cited

U.S. PATENT DOCUMENTS 10,963,692 B1\* 3/2021 Corcoran ............. G06V 30/414

2023/0147685 A1\* 5/2023 Koch .................. G06V 30/147
  382/103
2023/0245485 A1\* 8/2023 Rimchala ............ G06V 30/413
  382/176

FOREIGN PATENT DOCUMENTS

CN 110309338 A \* 10/2019
JP 4302799 B2 \* 7/2009 ......... G06K 9/00335

OTHER PUBLICATIONS

Huang, Pei-Chi, Ejan Shakya, Myoungkyu Song, and Mahadevan Subramaniam. "BioMDSE: A Multimodal Deep Learning-Based Search Engine Framework for Biofilm Documents Classifications." In 2022 IEEE International Conference on Bioinformatics and Biomedicine (BIBM), pp. 3608-3612. IEEE, 2022. (Year: 2022).\*

(Continued)

*Primary Examiner* — Carol Wang
(74) *Attorney, Agent, or Firm* — Patterson + Sheridan, LLP (57) ABSTRACT

Aspects of the present disclosure provide techniques for image-based document search. Embodiments include receiving an image of a document and providing the image of the document as input to a machine learning model, where the machine learning model generates separate embeddings of a plurality of patches of the image of the document and the machine learning model generates an embedding of the image of the document based on the separate embeddings of the plurality of patches. Embodiments include determining a compact embedding of the image of the document based on applying a dimensionality reduction technique to the embedding of the image of the document generated by the machine learning model. Embodiments include performing a search for relevant documents based on the compact embedding of the image of the document. Embodiments include performing one or more actions based on one or more relevant documents identified through the search.

20 Claims, 5 Drawing Sheets

(51) Int. Cl.
    *G06V 30/413*     (2022.01)
    *G06V 10/762*     (2022.01)
    *G06V 10/776*     (2022.01)
    *G06V 10/774*     (2022.01)

(52) U.S. Cl.
    CPC .......... *G06V 10/776* (2022.01); *G06V 30/413* (2022.01); *G06V 30/418* (2022.01)

(56) References Cited

OTHER PUBLICATIONS

Yan, Yuanjie, Hongyan Hao, Baile Xu, Jian Zhao, and Furao Shen. "Image clustering via deep embedded dimensionality reduction and probability-based triplet loss." IEEE Transactions on Image Processing 29 (2020): 5652-5661. (Year: 2020).*

Xu, Yiheng, Minghao Li, Lei Cui, Shaohan Huang, Furu Wei, and Ming Zhou. "Layoutlm: Pre-training of text and layout for document image understanding." In Proceedings of the 26th ACM SIGKDD International Conference on Knowledge Discovery & Data Mining, pp. 1192-1200. 2020. (Year: 2020).*

\* cited by examiner

IMAGE-BASED DOCUMENT SEARCH USING MACHINE LEARNING

INTRODUCTION

Aspects of the present disclosure relate to techniques for image-based document search using machine learning. In particular, techniques described herein involve utilizing a machine learning model that analyzes patches of images of documents to generate embeddings for use in performing a document search without requiring the use of optical character recognition (OCR).

BACKGROUND

Every year millions of people, businesses, and organizations around the world utilize software applications to assist with countless aspects of life. In some cases, a software application may automatically determine similarities between electronic documents, such as for determining attributes or classifications of documents. However, automatic determinations of electronic document similarity through existing techniques may be inaccurate in some cases, and may be computationally expensive. Documents that are not accompanied by metadata may be particularly difficult to search and categorize without computationally expensive processes such as OCR.

As such, there is a need in the art for improved techniques of determining electronic document similarity.

BRIEF SUMMARY

Certain embodiments provide a method for image-based document search. The method generally includes: receiving an image of a document; providing the image of the document as input to a machine learning model, wherein; the machine learning model generates separate embeddings of a plurality of patches of the image of the document; and the machine learning model generates an embedding of the image of the document based on the separate embeddings of the plurality of patches of the image of the document; determining a compact embedding of the image of the document based on applying a dimensionality reduction technique to the embedding of the image of the document generated by the machine learning model; performing a search for relevant documents based on the compact embedding of the image of the document; and performing one or more actions based on one or more relevant documents identified through the search.

Other embodiments provide a system comprising one or more processors and a non-transitory computer-readable medium comprising instructions that, when executed by the one or more processors, cause the system to perform a method. The method generally includes: receiving an image of a document; providing the image of the document as input to a machine learning model, wherein; the machine learning model generates separate embeddings of a plurality of patches of the image of the document; and the machine learning model generates an embedding of the image of the document based on the separate embeddings of the plurality of patches of the image of the document; determining a compact embedding of the image of the document based on applying a dimensionality reduction technique to the embedding of the image of the document generated by the machine learning model; performing a search for relevant documents based on the compact embedding of the image of the document; and performing one or more actions based on one or more relevant documents identified through the search.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for utilizing machine learning techniques for image-based document search.

Software applications may determine similarities between electronic documents for a variety of purposes, such as document classification, document content extraction, document recommendations, training of machine learning models, and/or the like. However, existing techniques for automatically determining similarities between electronic documents generally rely on metadata that may not always be available, or may involve computationally expensive and time consuming processes such as optical character recognition (OCR). Furthermore, existing techniques that identify similarities between documents based on text such as document titles often perform poorly, such as due to relying on superficial information and failing to consider other latent indicators of similarity between electronic documents.

According to certain embodiments, an image-based machine learning model is used to determine embeddings of images of documents for use in determining document similarity based on comparing such embeddings. In particular embodiments, as described in more detail below with respect to FIGS. 1 and 2, a machine learning model analyzes individual patches (e.g., portions of the image) from within an image of a document separately and in combination in order to determine an overall embedding of the image of the document. For example, the machine learning model may be a transformer model that generates embeddings of each of a plurality of patches that make up the image, and combines the embeddings of all of the patches in order to produce an embedding of the overall image. Embeddings generated using such a machine learning model may allow documents to be compared to one another for determining similarities in an accurate, performant manner that takes into account latent similarities (e.g., in the structure and appearance of the documents) at a fine granularity, and without requiring computationally-expensive processes such as OCR.

As described in more detail below with respect to FIG. 1, dimensionality reduction may be employed in order to reduce the size of embeddings of document images that are generated using an image-based machine learning model, thereby allowing for more computationally efficient and focused comparisons of embeddings. Furthermore, as described in more detail below with respect to FIGS. 1 and 3, one or more fine-tuned adapter modules may be attached to the image-based machine learning model, such as being fine-tuned for one or more particular domains or document types, and may be used to further enhance the accuracy of electronic document similarity determinations. For example, in cases where embeddings generated by the image-based machine learning model are determined not to pass a quality check (e.g., based on metrics related to how well such embeddings cluster), one or more fine-tuned adapter modules may be used in conjunction with the image-based machine learning model to produce higher-quality embeddings for the type of documents being compared. An adapter module may accept as inputs embeddings generated by one or more layers of the image-based machine learning model, and may output adapted embeddings. For example, an adapter module may be fine-tuned through a supervised learning process based on training data for one or more specific domains or document types, as described in more detail below with respect to FIG. 3.

Embeddings of images of documents that are generated using techniques described herein using an image-based machine learning model and, in some embodiments, one or more fine-tuned adapter modules, allow similarities between documents to be more accurately and efficiently identified. Document similarities determined using such techniques may be used for a variety of real world business-related purposes, such as automated document classification, training of machine learning models, selecting relevant documents to provide to a user (e.g., via a user interface), and/or the like.

Embodiments of the present disclosure provide multiple improvements over conventional techniques for automated identification of similarities between electronic documents. For example, by utilizing image-based machine learning techniques to analyze images of documents in order to generate embeddings for use in comparing documents, techniques described herein provide accurate document similarity determinations with reduced computing resource utilization as compared to the use of OCR and other computationally expensive techniques, thereby improving the functioning of the computing devices involved. Furthermore, by performing dimensionality reduction in order to produce compact embeddings, embodiments of the present disclosure allow document similarity to be determined in an even more computationally-efficient manner through comparing the compact embeddings (e.g., as opposed to comparing embeddings with larger dimensions such as having a larger number of dimensions). Determining document similarity with a high degree of accuracy was not possible in prior solutions without the use of computationally expensive techniques such as OCR, and thus could not previously be effectively performed on large sets of documents. By reducing the amount of computing resources required to accurately determine document similarity, embodiments of the present disclosure allow accurate document searches to be performed on large sets of documents with a high level of efficiency.

Certain embodiments of the present disclosure provide further technical improvements through the training and use of fine-tuned adapter modules. For example, by fine-tuning adapter modules to adapt embeddings determined at one or more layers of an image-based machine learning model with a greater focus on a particular domain or purpose, techniques described herein improve the accuracy of the domain specific embeddings, and consequently the document similarity determinations for each domain, without requiring the underlying image-based machine learning model itself to be fine-tuned or otherwise trained for the specific domain or purpose. Furthermore, by dynamically selecting when to use the fine-tuned adapter module(s) based on performing domain specific quality checks on embeddings determined using the image-based machine learning model, embodiments of the present disclosure further improve the functioning of the computing devices involved by avoiding the additional computing resource utilization associated with use of such adapter module(s) when not needed.

Techniques described herein allow documents to be clustered based on visual contents, which opens the door to informative selection of documents for classification or labeling (e.g., for generating labeled training data). Embedding vectors generated using techniques described herein allow a content-based document search to be performed without requiring computationally expensive processes such as OCR, even when little or no document metadata is available. For example, documents that are determined to be similar to a given document may be associated with labels (e.g., classifications) and other metadata, and these labels or other metadata may be applied to the given document based on the similarity determined using embodiments of the present disclosure, such as to generate training data for training another machine learning model or to otherwise classify the given document. Furthermore, document similarity determined as described herein can allow for informed automated determinations of which document subsets can be processed using the same machine learning model, and which document subsets require more specialized analysis, such as by different machine learning models that are configured or trained in a more targeted manner.

Thus, techniques described herein allow for labeling and/or otherwise classifying documents that could not otherwise be labeled or classified in an automated manner using existing systems (e.g., without manual review).

Figure 1:
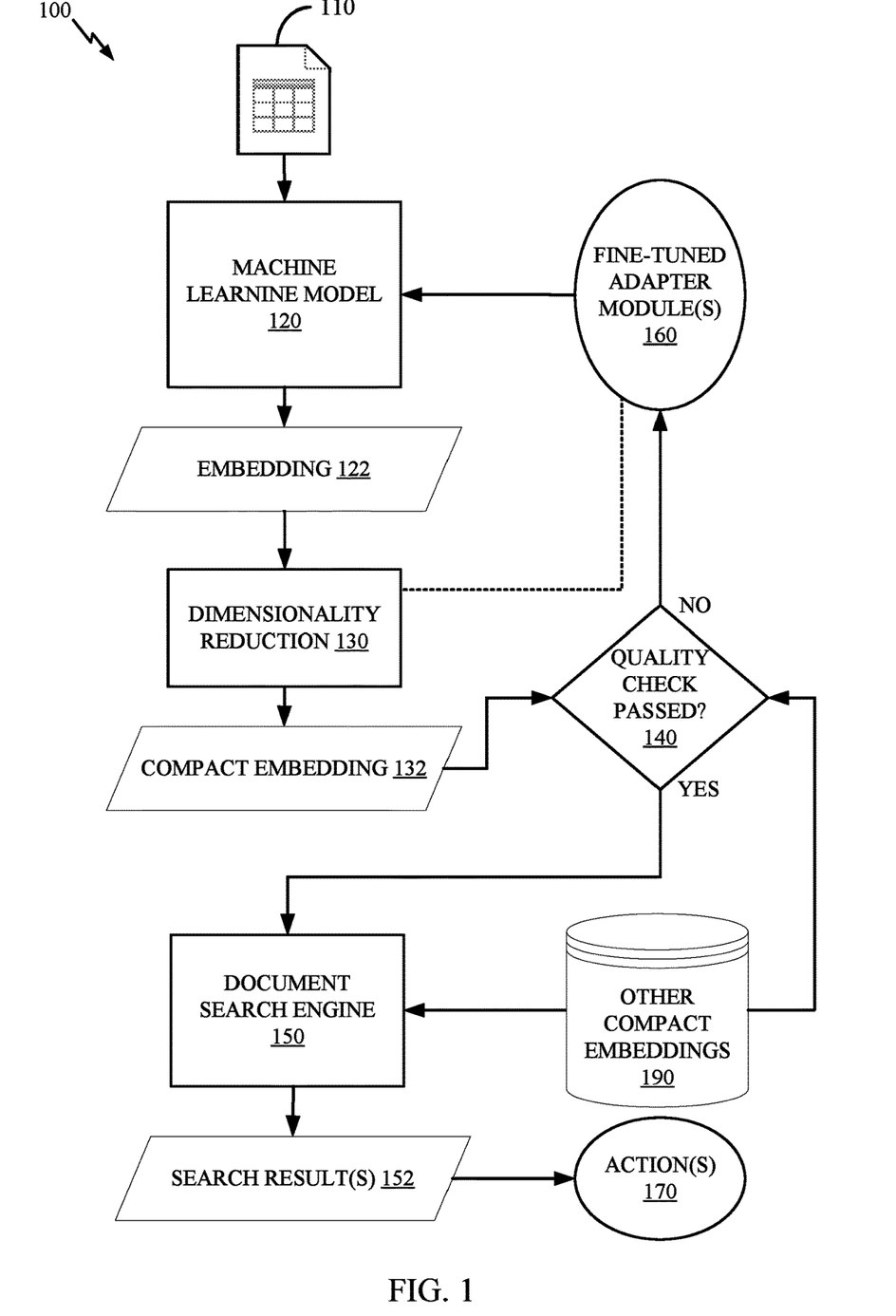
FIG. 1 depicts an example of utilizing image-based machine learning techniques to determine electronic document similarity as described herein.

Automated Document Similarity Determinations through Image Based Machine Learning FIG. 1 is an illustration 100 of utilizing image-based machine learning techniques to automatically determine document similarity as described herein.

Document image 110 represents an image of a document, such as a scan, photo, or other visual representation of a document. Document image 110 may come from any of a variety of different sources, such as being submitted by a user of an application, downloaded or otherwise retrieved from a source (e.g., the internet), or the like.

In one example, document image 110 is an image of a particular type of form, such as related to tax preparation. For example, document image 110 may be stored and/or processed in connection with a software application that provides financial services such as accounting and/or tax preparation functionality.

A machine learning model 120 is used to automatically determine an embedding 122 of document image 110. For instance, machine learning model 120 may be an image-based machine learning model. As described in more detail below with respect to FIG. 2, machine learning model 120 may split document image 110 into a plurality of patches, analyze the plurality of patches of document image 110 separately, such as generating embeddings of each patch and then combining the embeddings of the patches to produce an overall embedding of document image 110.

Machine learning model 120 may, for example, be an image-based transformer model. A transformer model is a deep learning model that adopts the mechanism of self-attention, differentially weighting the significance of each part of the input data. In deep learning, a machine learning model learns to perform classification tasks directly from input data such as images, text, or sound. Deep learning models are trained by using a large set of labeled data and neural network architectures that generally contain a large number layers. Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. In some cases, a neural network comprises one or more aggregation layers, such as a softmax layer. A shallow neural network generally includes only a small number of "hidden" layers between an input layer and an output layer. By contrast, a deep neural network (DNN) generally includes a larger number of hidden layers.

An image-based transformer model generally accepts image data as input and outputs a classification related to the input image data, such as based on an embedding of the image data that is determined by the model. In one example, machine learning model 120 is an OCR-free document understanding transformer model, such as the Donut Swin Encoder Model.

An embedding generally refers to a vector representation of an entity that represents the entity as a vector in n-dimensional space such that similar entities are represented by vectors that are close to one another in the n-dimensional space. In one example, machine learning model 120 generates embeddings of multiple patches of document image 110 and then generates an overall embedding of document image 110 based on the embeddings of the multiple patches (e.g., by concatenating or otherwise combining the embeddings of the multiple patches). While machine learning model 120 may utilize the generated embeddings to perform classification tasks, the embeddings themselves may be output by the model for use in techniques described herein.

In some embodiments, training of machine learning model 120 is a supervised learning process that involves providing training inputs (e.g., images) as inputs to machine learning model 120. Machine learning model 120 processes the training inputs and outputs predictions (e.g., classifications based on embeddings generated by the model for the images) based on the training inputs. The predictions are compared to the known labels associated with the training inputs (e.g., labels manually applied to training data by experts indicating known classifications of the images) to determine the accuracy of the machine learning model, and parameters of machine learning model 120 are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art. In some embodiments, such a training process has been performed for machine learning model 120 in advance by a third party, such as based on a large training data set that is not specific to a domain or purpose for which machine learning model 120 is used in embodiments of the present disclosure.

Document image 110 is provided as an input to machine learning model 120 (e.g., which may have been pre-trained as described above), and an embedding 122 of document image 110 is received as an output from machine learning model 120 in response to the input. In certain embodiments, dimensionality reduction 130 is further performed on embedding 122 in order to produce a compact embedding 132. Dimensionality reduction 130 may involve performing one or more techniques in order to produce an embedding with fewer dimensions than the original embedding. For example, embeddings produced by image-based transformer models generally have a large number of dimensions. Dimensionality reduction may have many benefits, such as making computations more efficient (e.g., requiring fewer computation resources to compare embeddings), reducing the amount of storage resources required, as well as reducing "noise" in the embedding data. Because embeddings may sometimes have values for very few dimensions, dimensionality can usually be reduced without losing the "signal" in the data. Many possible dimensionality reduction techniques exist, such as principal component analysis, non-negative matrix factorization, linear discriminator analysis, non-linear discriminator analysis, the skip-gram with negative sampling technique, and Uniform Manifold Approximation and Projection (UMAP). Any such techniques, or others, may be employed in certain embodiments of the present disclosure.

In some embodiments, dimensionality reduction 130 may involve the use of a machine learning model that is trained to reduce the dimensionality of embeddings. In one particular example, dimensionality reduction 130 involves the use of a multilayer perceptron (MLP) as a tunable dimensionality reducer, with only MLP-layer parameters being tunable during fine-tuning or training. An MLP is a fully connected class of feedforward artificial neural network (ANN). For example, an MLP layer may be trained through a supervised learning process, and may provide accurate results even when only fine-tuned using a small amount of training data that is specific to the domain or purpose for which the compact embedding is to be used. As described in more detail below, dimensionality reduction 130 may be separate from, or may involve the use of, fine-tuned adapter module(s) 160, which may comprise one or more MLP layers. Compact embedding 132 generally comprises a dimensionality-reduced version of embedding 122.

At step 140, a quality check is performed with respect to compact embedding 132, such as to determine whether compact embedding 132 is of sufficient quality for use in comparing compact embedding 132 to other embeddings, or if one or more fine-tuned adapter modules 160 should be used. The quality check may involve, for example, determining how well compact embedding 132 clusters with other compact embeddings of document images. For example, one or more clustering algorithms such as k-means clustering and/or k-elbow optimal cluster number determination may be applied to a plurality of embeddings, including compact embedding 132, and one or more metrics may be determined with respect to the generated clusters. In certain embodiments, an inter-cluster versus intra-cluster distance ratio, and/or the like may be determined. An inter-cluster versus intra-cluster distance ratio may be referred to as "compactness," and a smaller ratio generally indicates a higher quality cluster. A silhouette coefficient may also be determined in some embodiments. For example, a silhouette coefficient may be determined by calculating (b-a)/max(a,b), where a=the average intra-cluster distance (e.g., the average distance between each point within a cluster) and b=the average inter-cluster distance (e.g., the average distance between all clusters). In certain embodiments, a supervised measure of clustering accuracy may also be determined. For example, a cluster may be determined to be accurate if it includes embeddings of documents that are determined through the use of a supervised machine learning model to be classified similarly.

One or more of these metrics (e.g., inter-cluster versus intra-cluster distance ratio, silhouette coefficient, supervised measure of clustering accuracy, and/or the like) may be used to determine whether compact embedding 132 is of sufficient quality. For example, one or more of these metrics may be used to calculate a quality measure such as a quality score, such as based on predetermined weights associated with each of the one or more metrics. In one example, the quality check at step 140 passes if a quality measure exceeds a threshold or does not pass if the quality measure does not exceed the threshold. If the quality check at step 140 passes, then compact embedding 132 is used by document search engine 150 to search for documents similar to document image 110, such as based on comparing compact embedding 132 to other compact embeddings 190, such as corresponding to other documents, which may be stored in a data store. Embeddings may be compared, for example, using cosine similarity. Two embeddings may be determined to be similar if a cosine similarity between the two embeddings exceeds a threshold. Two documents may be determined to be similar if embeddings representing the two documents are determined to be similar. Document search engine 150 may be a software component that compares embeddings to one another in order to determine documents that are similar to one another, and may produce search result(s) 152 based on such comparisons. For example, search result(s) 152 may indicate one or more documents (e.g., corresponding to one or more of compact embeddings 190) that are determined to be similar to document image 110.

Search result(s) 152 may be used to perform one or more actions 170, such as by a software application. Action(s) 170 may include, for example, automatically classifying a document (e.g., document image 110), providing one or more documents via a user interface, providing other content related to one or more documents via a user interface, reorganization of document collections based on visual similarities, generating training data based on search result(s) 152, training a machine learning model using training data, and/or the like.

If the quality check at step 140 does not pass, then one or more fine-tuned adapter modules 160 may be used in conjunction with machine learning model 120 to produce a different embedding of document image 110. As described in more detail below with respect to FIG. 3, adapter module(s) 160 may be trainable machine learning module(s), such as MLP(s), that are attached to machine learning model 120 but are fine-tuned for a more particular domain or purpose, such as document search (e.g., in some embodiments, for one or more particular types of documents). A fine-tuned adapter module 160 may be smaller than machine learning model 120, such as having significantly fewer parameters, may accept an output (e.g., an embedding) from a layer of machine learning model 120 as an input, and may output an adapted embedding. In one example, a fine-tuned adapter module 160 is attached to a final layer of machine learning model 120 that produces an embedding, while some embodiments involve one or more fine-tuned adapter modules 160 being attached to one or more layers of machine learning model 120. Fine-tuning generally refers to a process by which parameters of a pre-trained machine learning model are trained on new training data (e.g., specific to a particular domain or purpose). Thus, references to "training" herein may also refer to fine-tuning.

When one or more fine-tuned adapter modules 160 are used in conjunction with machine learning model 120, an embedding may be output by the one or more fine-tuned adapter modules, and dimensionality reduction 130 may be performed on the embedding to produce a compact embedding, as described above with respect to compact embedding 132. Alternatively, one or more fine-tuned adapter modules 160 may themselves perform dimensionality reduction, and may output a compact adapted embedding. The compact embedding may then be used by document search engine 150 to search for similar documents, such as comparing the compact embedding to other compact embeddings 190, as described above. Furthermore, document search engine 150 may produce search result(s) based on the comparison, which may be used to perform one or more actions, as described above.

In some embodiments, search results produced by document search engine 150 are used to generate training data for training one or more machine learning models. For example, if search result(s) 152 indicate that a particular document is similar to document image 110, then a known classification of the particular document may be applied to document image 110, and the known classification may be used as a label associated with document image 110 in a training data instance for training a classification model that classifies documents based on images of the documents. Thus, techniques described herein may allow training data to be automatically generated in order to further improve the performance of one or more machine learning models.

Example Machine Learning Model

Figure 2:
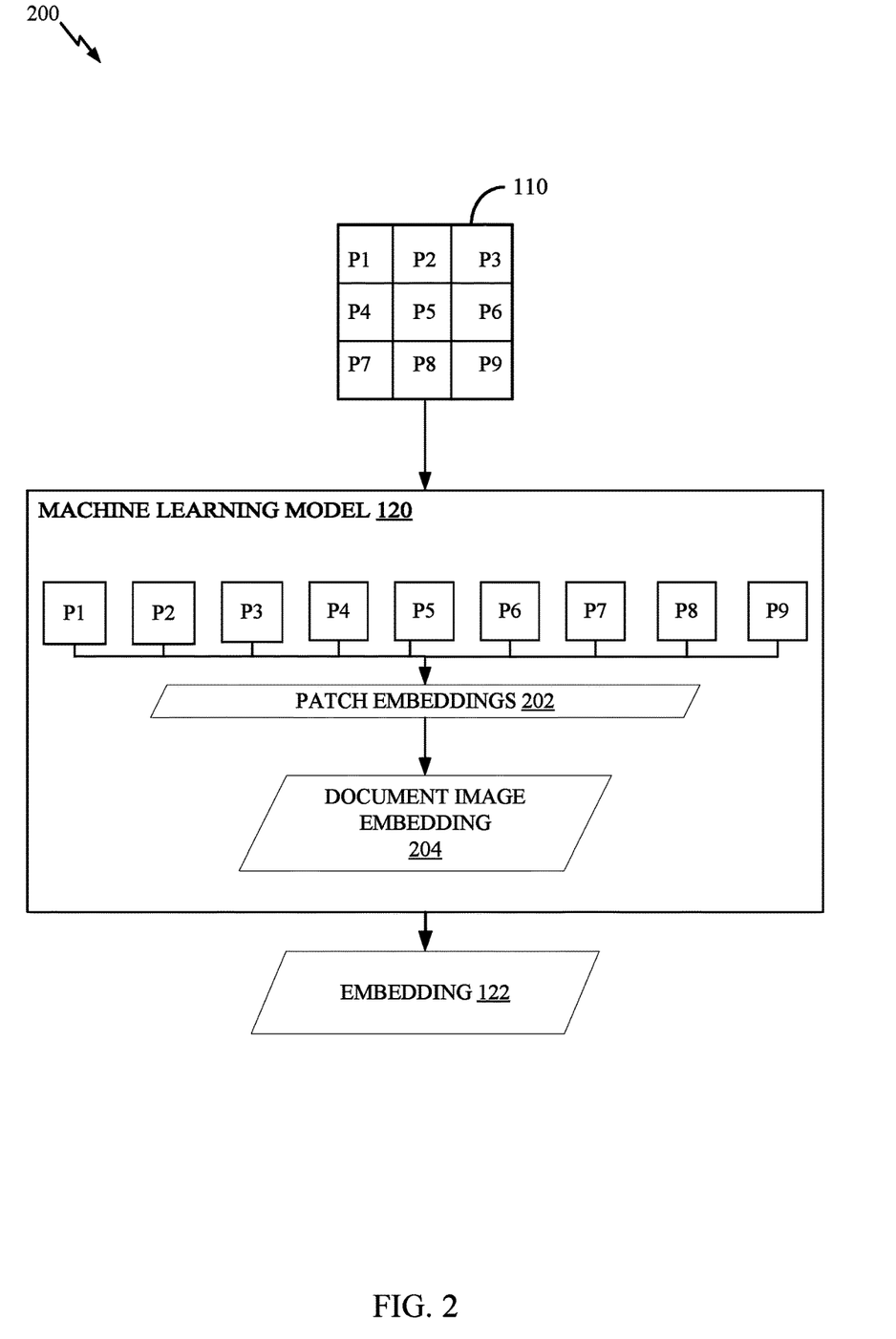
FIG. 2 depicts an example of a machine learning model that analyzes patches of images of documents in order to determine embeddings as described herein.

FIG. 2 is an illustration 200 of an example machine learning model 120 that analyzes patches of an image in order to determine an embedding of the image as described herein. Illustration 200 comprises document image 110, machine learning model 120, and embedding 122 of FIG. 1.

Document image 110 may be split into a plurality of patches, depicted as P1-P9, which may be non-overlapping subsets of document image 110. For example, document image 110 may be split into a fixed number of patches, may be split into a number of patches that is determined based on a size and/or resolution of document image 110, or may be split into a number of patches based on a fixed size of each patch, and/or the like. The splitting of document image 110 into patches may be performed within machine learning model 120.

In the depicted example, machine learning model 120 determines patch embeddings 202 for each of a plurality of patches P1-P9 of document image 110. Each of patch embeddings 202 may be an embedding of a given patch. For example, patch embeddings 202 may include an embedding of patch P1, an embedding of patch P2, an embedding of patch P3, an embedding of patch P4, an embedding of patch P5, an embedding of patch P6, an embedding of patch P7, an embedding of patch P8, and an embedding of patch P9. In some embodiments, patch embeddings 202 are run in a forward pass through one or more internal layers of machine learning model 120.

Machine learning model 120 generates a document image embedding 204 based on patch embeddings 202. For example, machine learning model 120 may concatenate all of patch embeddings 202 (e.g., from left-to-right and top-to-bottom with respect to the positions of the patches within document image 110) to produce document image embedding 204. It is noted that this is included as an example, and other techniques for generating document image embedding 204 based on patch embeddings 202 are possible. For example, patch embeddings 202 may be combined in one or more different ways to produce document image embedding 204, such as determining an average, minimum, maximum, median, or some other aggregation technique (e.g., across each dimension of the embedding space).

Machine learning model 120 outputs embedding 122, which may be document image embedding 204 or an embedding that is determined by performing additional processing on document image embedding 204, such as through one or more additional layers of machine learning model 120.

Fine-Tuning an Adapter Module

Figure 3:
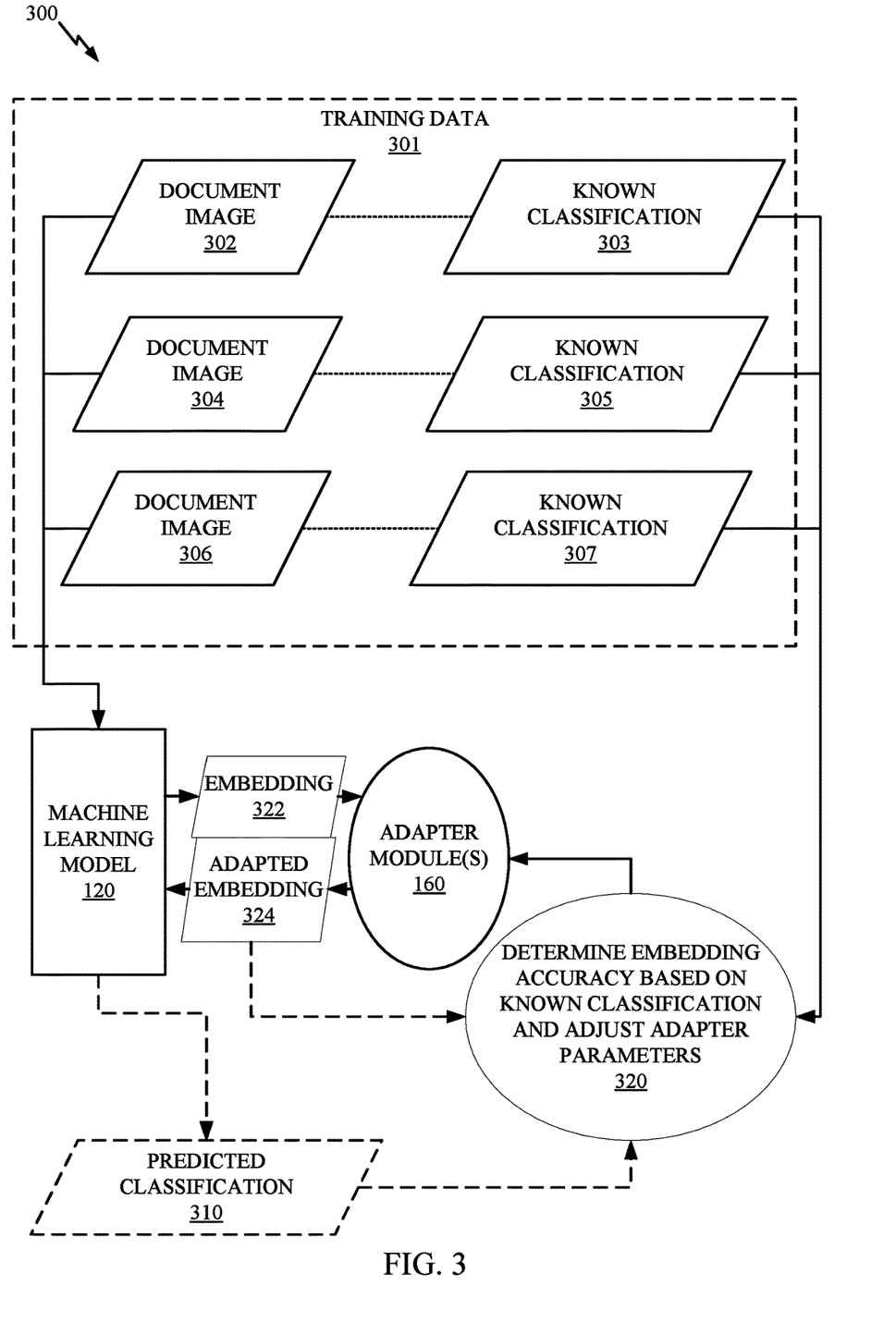
FIG. 3 depicts an example of training one or more fine-tuned adapter modules for a machine learning model related to image-based document search as described herein.

FIG. 3 is an illustration 300 of an example of fine-tuning an adapter module for adapting embeddings determined using a machine learning model (e.g., machine learning model 120) for a particular domain or purpose as described herein. Illustration 300 includes machine learning model 120 of FIGS. 1 and 2 and adapter module(s) 160 of FIG. 2. For example, fine-tuning operations may be performed by a model training component, such as model trainer 518 of FIG. 5, described below.

Training data 301 may include a plurality of document images (e.g., document images 302, 304, and 306) associated with labels indicating known classifications (e.g., known classification labels 303, 305, and 307). For example, training data 301 may include a plurality of document images relating to a particular domain or purpose that have previously been classified by a user or expert, and the labels may indicate these known classifications.

There are many different types of machine learning models that can be used in embodiments of the present disclosure. For example, machine learning model 120 may be an OCR-free document intelligence model, such as an image-based transformer model. Machine learning model 120 may also be an ensemble of several different individual machine learning models. Such an ensemble may be homogenous (i.e., using multiple member models of the same type) or non-homogenous (i.e., using multiple member models of different types). Adapter module(s) 160 may include one or more smaller machine learning models than machine learning model 120, such as having significantly fewer parameters than machine learning model 120, and may be used to adapt outputs of one or more layers of machine learning model 120 to the domain or purpose corresponding to training data 301.

In some embodiments, fine-tuning adapter module(s) 160 is a supervised learning process that involves providing training inputs representing document images (e.g., document images 302, 304, and 306) as inputs to machine learning model 120. Machine learning model 120 processes the training inputs through its various layers and outputs embeddings such as embedding 322. The embeddings are provided as inputs to one or more adapter modules 160, and the one or more adapter modules 160 process the embeddings and output adapted embeddings such as adapted embedding 324.

In some embodiments, the adapted embeddings are (optionally) provided back to machine learning model 120, such as to subsequent layer(s) of machine learning model 120, and are used to determine predicted classifications of the document images (e.g., document images 302, 304, and 306), including predicted classification 310. Predictions may, in some embodiments, be in the form of probabilities with respect to each possible classification, such as indicating a likelihood that a text string corresponds to each of a set of possible classifications. At step 320, the accuracy of the adapted embeddings produced by adapter module(s) 160 is determined based on the known classifications associated with the training inputs (e.g., known classification labels 303, 305, and 307), and the one or more adapter modules 160 are iteratively adjusted until one or more conditions are met. For instance, the one or more conditions may relate to an objective function (e.g., a cost function or loss function) for optimizing one or more variables (e.g., classification accuracy of machine learning model 120 in conjunction with adapter module(s) 160). In some embodiments, the conditions may relate to whether the predictions produced by the machine learning model 120 based on the training inputs and the adapted embeddings produced by adapter module(s) 160 match the labels associated with the training inputs or whether a measure of error between training iterations is not decreasing or not decreasing more than a threshold amount.

In other embodiments, at step 320, the adapted embeddings 324 output by adapter module(s) 160 are compared to one another to determine whether adapted embeddings that correspond to the same known classification label are close to one another (e.g., having a cosine similarity within a threshold distance). For example, if known classification label 202 and known classification label 305 refer to the same classification, then it would be expected that adapted embeddings of document image 302 and document image 304 should be within a threshold distance of one another. Thus, the adapted embeddings 324 produced by adapter module(s) 160 for document image 302 and document image 304 may be compared to one another to determine whether these adapted embeddings are close to one another, and so to determine the accuracy of the adapted embeddings produced by adapter module(s) 160. The one or more adapter modules 160 are iteratively adjusted based on such comparison until one or more conditions are met. For instance, the one or more conditions may relate to an objective function (e.g., a cost function or loss function) for optimizing one or more variables (e.g., accuracy of adapted embeddings). In some embodiments, the conditions may relate to whether the adapted embeddings produced by adapter module(s) 160 are consistent with known classification labels (e.g., 303, 304, and 305), such as based on whether adapted embeddings of images known to be classified similarly or in the same way are within a threshold distance of one another, or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for adapter module(s) 160, such as based on validation data and test data, as is known in the art.

In some embodiments, a supervised or a semi-supervised learning process may be used to fine-tune adapter module(s) 160. In some cases, if only a small amount of training data is available, such as in a "few shot" learning context, an additional class-contrastive loss component may be included in an objective function used to train adapter module(s) 160. For example, the overall fine-tuning objective function may be expressed as a linear combination of (1) a cluster-contrastive objective among labeled and unlabeled points that aims to minimize distance between points predicted to be in the same cluster and maximize distance between points predicted to be in different clusters, and (2) a label/class-contrastive objective among labeled points that aims to minimize intra-class distance among labeled points and maximize inter-class distance among the labeled points. With this multi-task objective, fine-tuning can be performed on the last layer of the emedding generator (e.g., in machine learning model 120) and/or on adapter module(s) 160, which may map the outputs of the last embedding generator layer and output lower-dimensional embedding vectors to be used for clustering.

Fine-tuning adapter module(s) 160 may be significantly more efficient, and may produce significantly better results, than training or fine-tuning machine learning model 120 directly, such as due to the smaller number of parameters of adapter module(s) 160. Smaller models such as adapter module(s) 160 generally produce more generalizable results after being fine-tuned using a relatively small amount of training data than do larger models such as machine learning model 120 when fine-tuned with the same amount of training data. Furthermore, while machine learning model 120 may be a pre-trained model 120 that is provided by a third party, and may not be locally stored or fully customizable, adapter module(s) 160 may be locally stored and trained, thus providing a higher level of customizability, and a higher level of security. Furthermore, by utilizing machine learning model 120 in conjunction with adapter module(s) 160 as described herein, certain embodiments gain the benefits of a large pre-trained model such as machine learning model 120 while also gaining the benefits of a smaller fine-tuned model such as adapter module(s) 160.

Once fine-tuned, adapter module(s) 160 may be used as described herein in conjunction with machine learning model 120 to produce adapted embeddings for use in identifying similarities between documents.

Example Operations for Image-Based Document Search

Figure 4:
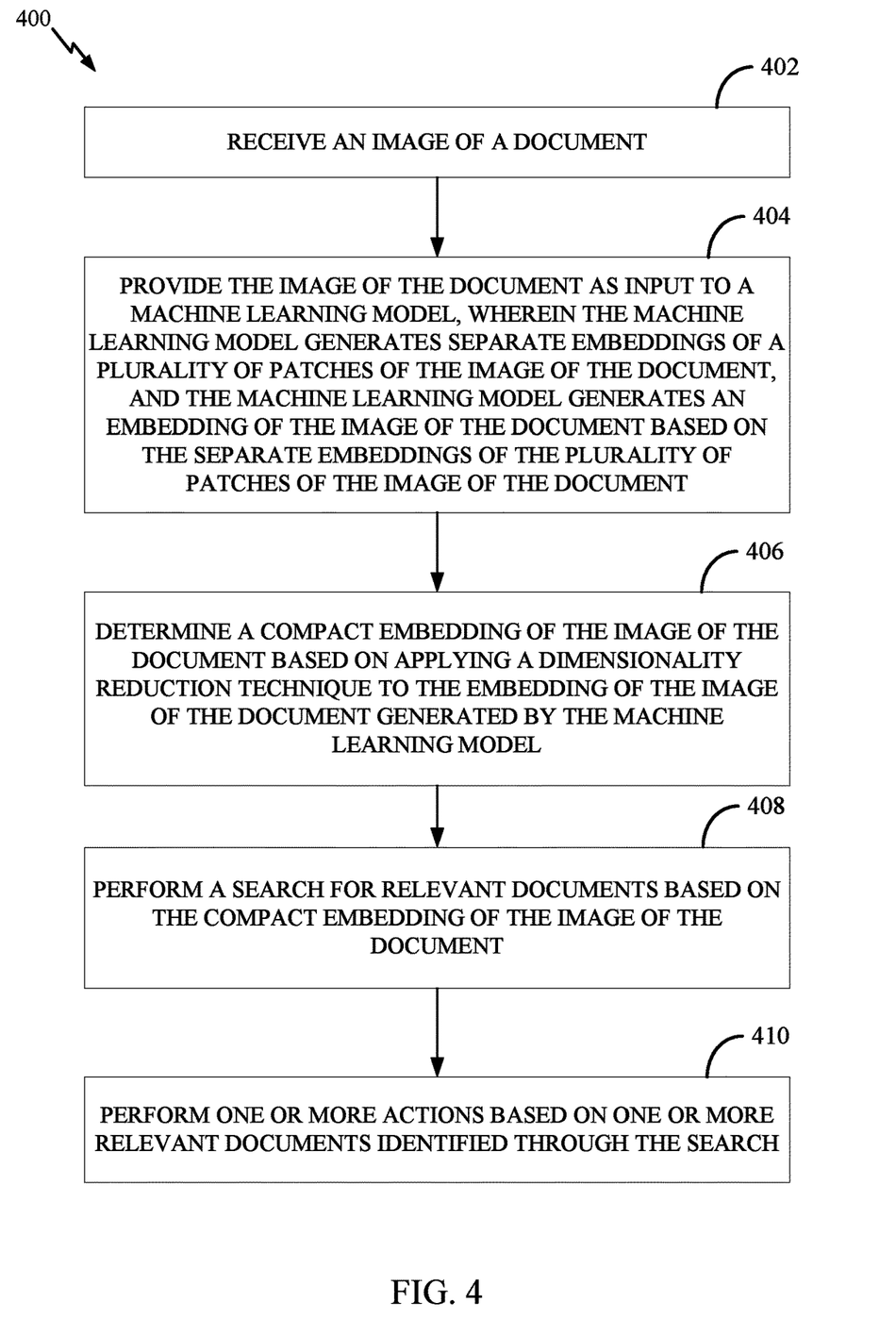
FIG. 4 depicts example operations related to image-based document search as described herein.

FIG. 4 depicts example operations 400 for image-based document search. For example, operations 400 may be performed by document search engine 150 of FIG. 1 and/or additional components depicted in FIGS. 1-3.

Operations 400 begin at step 402 with receiving an image of a document.

Operations 400 continue at step 404, with providing the image of the document as input to a machine learning model, wherein; the machine learning model generates separate embeddings of a plurality of patches of the image of the document; and the machine learning model generates an embedding of the image of the document based on the separate embeddings of the plurality of patches of the image of the document.

In certain embodiments, the machine learning model generates the embedding of the image of the document by combining the separate embeddings of the plurality of patches of the image of the document.

Some embodiments further comprise providing inputs to one or more adapter layers based on outputs from one or more layers of the machine learning model, wherein the one or more adapter layers have been trained through an iterative learning process based on training data comprising a plurality of images of documents associated with labels indicating known classifications of the documents. For example, a determination to use the one or more adapter layers may have been made based on one or more performance metrics with respect to the machine learning model. The one or more performance metrics with respect to the machine learning model may, for example, comprise one or more of: a silhouette coefficient; a ratio of inter-cluster distance to intra-cluster distance; or a supervised measure of clustering accuracy. In some embodiments, the one or more adapter layers were fine-tuned for a particular domain associated with the document. Examples of domains include medical, financial, legal, educational, and the like.

Operations 400 continue at step 406, with determining a compact embedding of the image of the document based on applying a dimensionality reduction technique to the embedding of the image of the document generated by the machine learning model.

Operations 400 continue at step 408, with performing a search for relevant documents based on the compact embedding of the image of the document.

In some embodiments, the performing of the search for the relevant documents based on the compact embedding of the image of the document comprises applying a clustering algorithm to the compact embedding of the image of the document and compact embeddings of a plurality of images of other documents to produce one or more clusters.

Operations 400 continue at step 410, with performing one or more actions based on one or more relevant documents identified through the search.

In some embodiments, performing the one or more actions based on the one or more relevant documents identified through the search comprises training a separate machine learning model based on a training data instance comprising: the image of the document; and label data that is associated with the one or more relevant documents.

In certain embodiments, performing the one or more actions based on the one or more relevant documents identified through the search comprises automatically classifying the image of the document based on a known classification associated with the one or more relevant documents.

In some embodiments, performing the one or more actions based on the one or more relevant documents identified through the search comprises grouping the one or more relevant documents with the image of the document for display via a user interface.

Notably, operations 400 is just one example with a selection of example steps, but additional methods with more, fewer, and/or different steps are possible based on the disclosure herein.

Example Computing System

Figure 5:
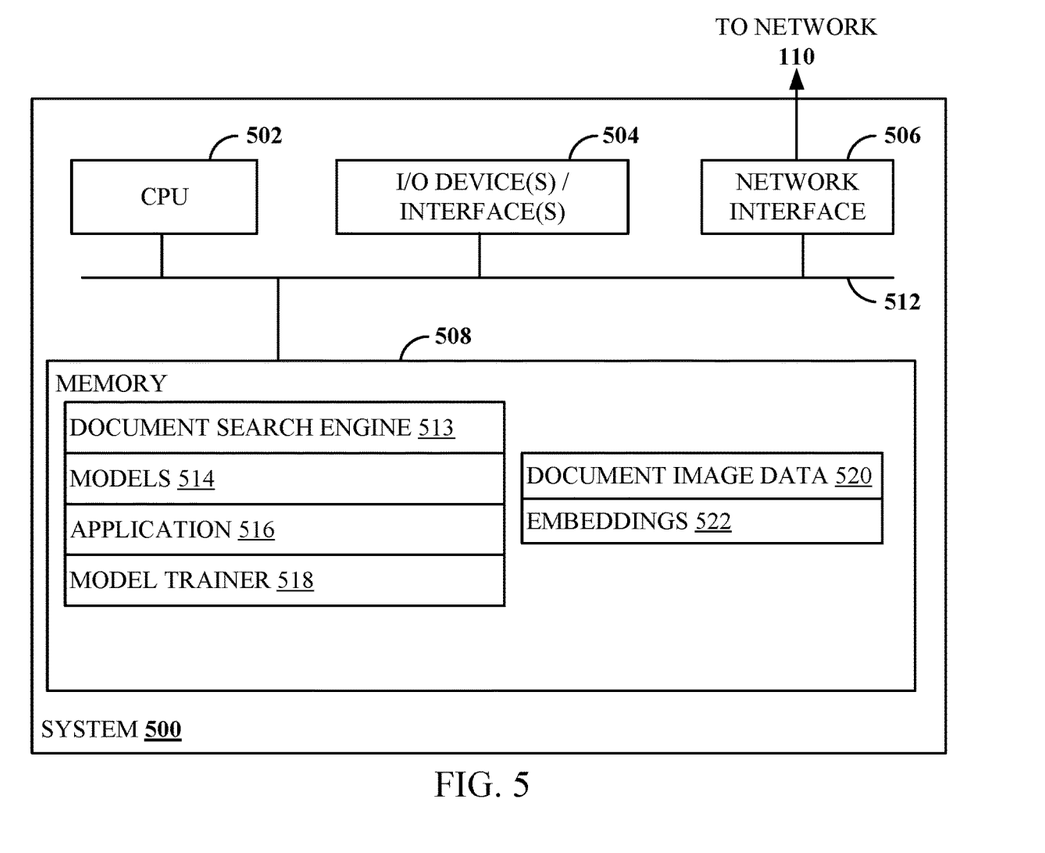
FIG. 5 depicts an example processing system for training and/or utilizing a machine learning model and/or one or more adapter modules for image-based document search as described herein.

FIG. 5 illustrates an example system 500 with which embodiments of the present disclosure may be implemented. For example, system 500 may be configured to perform operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 110. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes document search engine 513, which may correspond to document search engine 150 of FIG. 1, and may perform certain operations described herein, such as operations 500 of FIG. 5. For example, document search engine 513 may use one or more models 514 to automatically determine document similarity based on images of documents as described herein. Alternatively, document search engine 513 may be part of application 516. Application 516 may, for example, be a software application that performs operations related to document similarity, such as document classification, document recommendation, model training, and/or the like.

Memory 508 includes models 514, which may include machine learning model 120 of FIG. 1, one or more fine-tuned adapter modules 160 of FIG. 1, and/or one or more additional models (e.g., that are trained based on document similarities determined using techniques described herein, such as using a label of a similar documents to a document as a label for the document). Memory 508 further comprises model trainer 518, which may perform operations related to training one or more machine learning models, such as models 514. For example, model trainer 518 may perform the training process described with respect to FIG. 3.

Memory 508 further comprises document image data 520, which may include document image 110 of FIG. 1 and document images 302, 304, and 306 of FIG. 3. Memory 508 further comprises embeddings 522, which may include embedding 111 and compact embedding 132 of FIG. 1, patch embeddings 202 and document image embedding 204 of FIG. 2, and embedding 322 and adapted embedding 324 of FIG. 3.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of image-based document search, comprising:
   receiving an image of a document;
   providing the image of the document as input to a machine learning model, wherein;
      the machine learning model generates separate embeddings of a plurality of patches of the image of the document; and
      the machine learning model generates an embedding of the image of the document based on the separate embeddings of the plurality of patches of the image of the document;

determining a compact embedding of the image of the document based on applying a dimensionality reduction technique to the embedding of the image of the document generated by the machine learning model;

performing a search for relevant documents based on the compact embedding of the image of the document; and performing one or more actions based on one or more relevant documents identified through the search.

2. The method of claim 1, wherein performing the one or more actions based on the one or more relevant documents identified through the search comprises training a separate machine learning model based on a training data instance comprising:

the image of the document; and label data that is associated with the one or more relevant documents.

3. The method of claim 1, wherein performing the one or more actions based on the one or more relevant documents identified through the search comprises automatically classifying the image of the document based on a known classification associated with the one or more relevant documents.

4. The method of claim 1, wherein performing the one or more actions based on the one or more relevant documents identified through the search comprises grouping the one or more relevant documents with the image of the document for display via a user interface.

5. The method of claim 1, wherein the machine learning model generates the embedding of the image of the document by combining the separate embeddings of the plurality of patches of the image of the document.

6. The method of claim 1, further comprising providing inputs to one or more adapter layers based on outputs from one or more layers of the machine learning model, wherein the one or more adapter layers have been trained through an iterative learning process based on training data comprising a plurality of images of documents associated with labels indicating known classifications of the documents.

7. The method of claim 6, further comprising determining to use the one or more adapter layers based on one or more performance metrics with respect to the machine learning model.

8. The method of claim 7, wherein the one or more performance metrics with respect to the machine learning model comprise one or more of:

a silhouette coefficient;

a ratio of inter-cluster distance to intra-cluster distance;

a supervised measure of clustering accuracy.

9. The method of claim 6, wherein the one or more adapter layers were fine-tuned for a particular domain associated with the document.

10. The method of claim 1, wherein the performing of the search for the relevant documents based on the compact embedding of the image of the document comprises applying a clustering algorithm to the compact embedding of the image of the document and compact embeddings of a plurality of images of other documents to produce one or more clusters.

11. A system for image-based document search, comprising:

one or more processors; and a memory comprising instructions that, when executed by the one or more processors, cause the system to:

receive an image of a document;

provide the image of the document as input to a machine learning model, wherein;

the machine learning model generates separate embeddings of a plurality of patches of the image of the document; and the machine learning model generates an embedding of the image of the document based on the separate embeddings of the plurality of patches of the image of the document;

determine a compact embedding of the image of the document based on applying a dimensionality reduction technique to the embedding of the image of the document generated by the machine learning model;

perform a search for relevant documents based on the compact embedding of the image of the document; and perform one or more actions based on one or more relevant documents identified through the search.

12. The system of claim 11, wherein performing the one or more actions based on the one or more relevant documents identified through the search comprises training a separate machine learning model based on a training data instance comprising:

the image of the document; and label data that is associated with the one or more relevant documents.

13. The system of claim 11, wherein performing the one or more actions based on the one or more relevant documents identified through the search comprises automatically classifying the image of the document based on a known classification associated with the one or more relevant documents.

14. The system of claim 11, wherein performing the one or more actions based on the one or more relevant documents identified through the search comprises grouping the one or more relevant documents with the image of the document for display via a user interface.

15. The system of claim 11, wherein the machine learning model generates the embedding of the image of the document by combining the separate embeddings of the plurality of patches of the image of the document.

16. The system of claim 11, wherein the instructions, when executed by the one or more processors, further cause the system to provide inputs to one or more adapter layers based on outputs from one or more layers of the machine learning model, wherein the one or more adapter layers have been trained through an iterative learning process based on training data comprising a plurality of images of documents associated with labels indicating known classifications of the documents.

17. The system of claim 16, wherein the instructions, when executed by the one or more processors, further cause the system to determine to use the one or more adapter layers based on one or more performance metrics with respect to the machine learning model.

18. The system of claim 17, wherein the one or more performance metrics with respect to the machine learning model comprise one or more of:

a silhouette coefficient;

a ratio of inter-cluster distance to intra-cluster distance;

a supervised measure of clustering accuracy.

19. The system of claim 16, wherein the one or more adapter layers were fine-tuned for a particular domain associated with the document.

20. A non-transitory computer-readable medium comprising instructions that, when executed by one or more processors of a computing system, cause the computing system to:

receive an image of a document;
provide the image of the document as input to a machine learning model, wherein;
   the machine learning model generates separate embeddings of a plurality of patches of the image of the document; and
   the machine learning model generates an embedding of the image of the document based on the separate embeddings of the plurality of patches of the image of the document;
determine a compact embedding of the image of the document based on applying a dimensionality reduction technique to the embedding of the image of the document generated by the machine learning model;
perform a search for relevant documents based on the compact embedding of the image of the document; and
perform one or more actions based on one or more relevant documents identified through the search.

* * * * *